US012691951B2

(12) United States Patent
Terada et al.

(10) Patent No.: US 12,691,951 B2
(45) Date of Patent: Jul. 28, 2026

(54) LOWER VEHICLE-BODY STRUCTURE OF VEHICLE

(71) Applicant: MAZDA MOTOR CORPORATION, Hiroshima (JP)

(72) Inventors: Sakayu Terada, Aki-gun (JP); Miho Kurata, Aki-gun (JP); Takashi Yuuma, Aki-gun (JP); Isamu Kizaki, Aki-gun (JP); Munenari Takahashi, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 365 days.

(21) Appl. No.: 18/502,734

(22) Filed: Nov. 6, 2023

(65) Prior Publication Data
US 2024/0166272 A1 May 23, 2024

(30) Foreign Application Priority Data
Nov. 18, 2022 (JP) ................................. 2022-184880

(51) Int. Cl.
| *B62D 21/02* | (2006.01) |
| *B62D 25/02* | (2006.01) |
| *B62D 25/04* | (2006.01) |
| *B62D 25/14* | (2006.01) |
| *B62D 25/20* | (2006.01) |

(52) U.S. Cl.
CPC ......... *B62D 25/2036* (2013.01); *B62D 21/02* (2013.01); *B62D 25/025* (2013.01); *B62D 25/04* (2013.01); *B62D 25/145* (2013.01)

(58) Field of Classification Search
None
See application file for complete search history.

(56) References Cited

U.S. PATENT DOCUMENTS

| 7,887,123 | B2 * | 2/2011 | Honji | .................... | B62D 25/088 |
| | | | | | 296/203.02 |
| 8,690,227 | B2 * | 4/2014 | Matsuoka | ............ | B62D 25/025 |
| | | | | | 296/30 |
| 9,616,939 | B2 * | 4/2017 | Natsume | ................ | B62D 25/20 |
| 10,843,733 | B2 * | 11/2020 | Yoshida | ............ | B62D 25/2045 |
| 11,046,369 | B2 * | 6/2021 | Natsume | ............ | B62D 25/2036 |
| 11,214,310 | B2 * | 1/2022 | Hong | .................... | B62D 25/025 |
| 11,850,931 | B2 * | 12/2023 | Nusier | .................... | B60K 1/04 |
| 12,065,194 | B2 * | 8/2024 | Yamauchi | .......... | B62D 25/2045 |

(Continued)

FOREIGN PATENT DOCUMENTS

WO WO2011/055695 A1 3/2013

*Primary Examiner* — Aaron L Lembo

(74) *Attorney, Agent, or Firm* — Studebaker Brackett PLLC

(57) ABSTRACT

A vehicle body comprises a floor lower frame having front-and-rear end portions fixed to a rear end of a front side frame and a lower face of a floor panel, respectively, and a fixation portion where a suspension of a vehicle is fixed, a first floor upper frame extending along the floor lower frame and having front-and-rear end portions fixed to a dash panel and an upper face of a floor panel, respectively, a second floor upper frame connecting the dash panel and a hinge pillar on a rear side of the front side frame, and a connecting member connecting the first floor upper frame and a front end portion of a side sill in a vehicle width direction at a position above the floor panel.

17 Claims, 7 Drawing Sheets

(56) References Cited

U.S. PATENT DOCUMENTS

| | | | |
|---|---|---|---|
| 2012/0212009 A1 | 8/2012 | Ishizono et al. | |
| 2016/0039467 A1* | 2/2016 | Takenaka ............... | B62D 21/15 |
| | | | 296/193.07 |
| 2020/0361535 A1* | 11/2020 | Matsuda ............ | B62D 25/2036 |
| 2021/0070371 A1* | 3/2021 | Ebisumoto ............. | B62D 21/02 |

* cited by examiner

LOWER VEHICLE-BODY STRUCTURE OF VEHICLE

BACKGROUND OF THE INVENTION

The present invention relates to a lower vehicle-body structure of a vehicle.

Conventionally, various vehicle-body structures have been proposed as a structure to disperse a collision load generated in a case where a vehicle collides with an obstacle relatively approaching the vehicle from a vehicle's front side (hereafter, referred to as in "vehicle frontal collision"). For example, the patent document of WO2011/055695 (US2012/0212009 A1) discloses a structure to disperse a load inputting from a front side frame of a vehicle front portion in an in-plane direction of a floor panel by dispersing the load to a tunnel side member arranged at a vehicle central side and a side sill arranged at a vehicle side by way of a side frame extension (member) arranged below the floor panel.

Specifically, a vehicle lower structure according to the above-described patent document's structure has a basic structure comprising a pair of front side frames extending in a vehicle longitudinal direction at both sides, in a vehicle width direction, of a vehicle-body front portion, a dash board expanding in the vehicle width direction on a rear side of the front side frames and partitioning a cabin from its outside, a pair of side sills extending in the vehicle longitudinal direction on the rear side of the dash board and on each outward side, in the vehicle width direction, of the front side frames, a floor panel extending rearward from a lower rear portion of the dash board between the pair of side sills, a floor tunnel protruding upward at the center, in the vehicle width direction, of the floor panel and extending in the vehicle longitudinal direction, and a pair of tunnel members extending in the vehicle longitudinal direction along opposing side portions of the floor tunnel.

The above-described vehicle lower structure further comprises a pair of side frame extensions fixed to each rear end of the front side frames and extending rearward along a lower face of the dash board and a lower face of the floor panel. Each of the side frame extensions is arranged below the dash board and includes a side sill-side extension portion, a tunnel-side extension portion, and a branch portion between these portions. The side sill-side extension portion extends obliquely outward-and-rearward from the branch portion and then is joined to the side sill. The tunnel-side extension extends obliquely inward-and-rearward from the branch portion and then is joined to the tunnel side member.

The branch portion is provided with a sub-frame attachment portion where a sub frame of a suspension arranged at a vehicle lower part is attached.

Further, a connecting member (so-called torque box) extending in the vehicle width direction is provided to connect a front end of the side sill and the branch portion of the side frame extension. A side-collision load applied from a vehicle-body side can be received at this connecting member.

In the above-described structure, the side sill and the side frame extension are connected by the connecting member. By providing the above-described connection member, in a small overlap collision (hereafter, referred to as "SORB"), i.e., in a case where there occurs a laterally partial-offset frontal collision where a collision load of the vehicle width direction is applied to a front side of the side sill, the side sill can obtain appropriate reaction forces of the vehicle width direction against the collision load from the connecting member and the side sill frame extension, thereby properly receiving the collision load.

In this structure where the side sill and the side frame extension are connected by the connecting member, however, when a vehicle-traveling state is normal, vibration energy of the vehicle width direction generated from the suspension is transmitted from the side frame extension arranged below the floor panel to the side sill by way of the connecting member, and then transmitted to a whole part of the vehicle body by way of the side sill. Accordingly, factors to damage the comfortability of the vehicle traveling (so-called NVH, such as noise, vibration, harshness) may be deteriorated improperly.

SUMMARY OF THE INVENTION

The present invention has been devised in view of the above-described matter, and an object of the present invention is to provide a lower vehicle-body structure of a vehicle which can properly attain suppression of the vibration-energy transmission from the suspension to the vehicle body in addition to improvement of the impact resistant performance against the collision load generated in the vehicle frontal collision or SORB.

The lower vehicle-body structure of the vehicle of the present invention comprises a pair of front side frames extending in a vehicle longitudinal direction at both sides, in a vehicle width direction, of a vehicle-body front portion, a dash panel positioned on a rear side of the pair of front side frames and partitioning a cabin from outside, a pair of side sills arranged at both sides of a vehicle body on the rear side of the dash panel and extending in the vehicle longitudinal direction, a pair of hinge pillars extending in a vertical direction at each front end portion of the pair of side sills, a floor panel arranged between the pair of side sills and fixed to each of the pair of side sills, a floor lower frame having a front end portion which is fixed to each rear end of the pair of front side frames, a rear end portion which extends rearward at a position below the floor panel and is fixed to a lower face of the floor panel, and a fixation portion which is arranged between the front end portion and the rear end portion and where a suspension of the vehicle is fixed, a first floor upper frame positioned above the floor panel and extending along the floor lower frame, the first floor upper frame having a front end portion which is fixed to the dash panel on the rear side of the front side frame and a rear end portion which is fixed to an upper face of the floor panel, a second floor upper frame connecting the dash panel and the hinge pillar on the rear side of the front side frame, and a connecting member connecting the first floor upper frame and the front end portion of the side sill in the vehicle width direction at a position above the floor panel.

According to the present invention, the collision load received at the front side frame in the vehicle frontal collision is transmitted to the first floor upper frame and the second floor upper frame inside the cabin positioned on the rear side of the dash panel and above the floor panel. Thus, the collision load transmitted from the front side frame can be transmitted in the in-plane direction through two routes of the first floor upper frame and the second floor upper frame in a dispersion manner, so that the superior frontal collision performance (i.e., the high impact resistant performance against the vehicle frontal collision) can be attained.

Further, the connecting member connects the first floor upper frame and the side sill in the vehicle width direction inside the cabin. Therefore, since the reaction force of the vehicle width direction is generated when the collision load of the vehicle width direction is inputted to the front end of the side sill in the SORB, the superior SORB collision performance (i.e., the high impact resistant performance against the SORB) can be attained as well.

Additionally, the connecting member of the present invention connects the first floor upper frame and the side sill at a position which is offset, in the vertical direction, from the fixation portion of the floor lower frame where the suspension is fixed (i.e., apart from fixation portion via the floor panel). Therefore, the load of the vehicle width direction inputted to the floor lower frame from the suspension can be suppressed from being transmitted to other vehicle-body constituting components, such as the side sill or the floor panel. Thus, the suppression of the vibration-energy transmission from the suspension to the vehicle body can be attained.

In the above-described lower vehicle-body structure of the vehicle, it is preferable that each of the floor lower frame and the first floor upper frame have an inclination portion which is inclined toward a center, in the vehicle width direction, thereof as it goes rearward from the front end portion and a linear portion which extends rearward, in the vehicle longitudinal direction, from a rear end of the inclination portion.

According to this structure, each of the floor lower frame and the first floor upper frame is configured in a shape where it is bent at a border between the inclination portion and the linear portion, i.e., in a roughly V shape in a plan view, and the linear portion is positioned away from the second floor upper frame. Therefore, the collision load can be transmitted over a large area of the floor panel on the rear side of the front side frame.

In the above-described lower vehicle-body structure of the vehicle, it is preferable that a floor tunnel protruding upward at a center, in the vehicle width direction, of the floor panel and extending in the vehicle longitudinal direction be further provided, and the linear portion of each of the floor lower frame and the first floor upper frame be constituted by a tunnel side member which extends rearward along each of both-side ends of the floor tunnel.

According to this structure, since the linear portion is located at the furthest position from the second floor upper frame in a section of the floor panel between the side sill and the floor tunnel, the collision load can be transmitted over the largest area of the floor panel on the rear side of the front side frame. Moreover, since the linear portion extends in the vehicle longitudinal direction along the both-side ends of the floor tunnel, the floor tunnel can be reinforced, too.

In the above-described lower vehicle-body structure of the vehicle, it is preferable that each of the floor lower frame and the first floor upper frame form a closed-cross section together with the floor panel.

According to this structure, since the floor lower frame and the first floor upper frame extending along the floor lower frame respectively form the closed-cross section together with the floor panel, the rigidity of the floor lower frame and the first floor upper frame increases, thereby improving the frontal-and-SORB collision performance.

In the above-described lower vehicle-body structure of the vehicle, it is preferable that the dash panel have a body portion which extends in the vertical direction and a kick-up portion which extends rearward and downward from a lower end portion of the body portion, and the front end portion of the first floor upper frame and a front end portion of the second floor upper frame be fixed to the body portion of the dash panel in a state where both of the front end portions overlap each other.

According to this structure, since the collision load is transmitted in the vehicle longitudinal direction from the body portion extending in the vertical direction of the dash panel to the first floor upper frame and the second floor upper frame in the vehicle frontal collision or the SORB, the efficiency of the load transmission to the first floor upper frame and the second floor upper frame improves. Moreover, since the first floor upper frame and the second floor upper frame are fixed to the body portion in the overlapping state, the collision load is not easily transmitted to the kick-up portion positioned away from the body portion, so that deformation of the kick-up portion can be suppressed.

In the above-described lower vehicle-body structure of the vehicle, it is preferable that a dash cross member extending in the vehicle width direction along a front face of the dash panel be further provided, and an end portion of each of both sides, in the vehicle width direction, of the dash cross member and a front end portion of the second floor upper frame which is fixed to the dash panel be provided to overlap each other in an elevational view.

According to this structure, since the end portion of each of the both sides, in the vehicle width direction, of the dash cross member and the front end portion of the second floor upper frame which is fixed to the dash panel are provided to overlap each other in the elevational view, the collision load received at the dash cross member can be securely transmitted to the hinge pillar and the side sill by way of the second floor upper frame, thereby improving the vehicle-body rigidity.

In the above-described lower vehicle-body structure of the vehicle, it is preferable that the end portion of each of the both sides, in the vehicle width direction, of the dash cross member be provided to overlap a rear end portion of the front side frame in the elevational view.

According to this structure, the collision load can be securely transmitted to both the dash cross member and the second floor upper frame from the front side frame, thereby improving the vehicle-body rigidity.

In the above-described lower vehicle-body structure of the vehicle, it is preferable that the first floor upper frame, the second floor upper frame, and the connecting member be arranged in a triangular shape in a plan view.

According to this structure, since a trass structure (i.e., a triangle frame structure) is formed in the plan view by the first floor upper frame, the second floor upper frame, and the connecting member, the collision-load transmission efficiency can be improved.

In the above-described lower vehicle-body structure of the vehicle, it is preferable that the hinge pillar be a hollow-cylindrical shaped member and include a gusset member which is positioned near a lower end of an inside space portion thereof such that the gusset member partitions the inside space portion in the vertical direction, and a rear end portion of the second floor upper frame be fixed at a position of the hinge pillar where the gusset member is provided.

According to this structure, since the position of the hinge pillar where the gusset member is provided shows the highest rigidity, the second floor upper frame is fixed to this position with the highest rigidity, so that the superior frontal-and-SORB collision performance can be attained.

In the above-described lower vehicle-body structure of the vehicle, it is preferable that the front end portion of the first floor upper frame and a front end portion of the second floor upper frame which is fixed to the dash panel be provided to overlap each other in the vehicle longitudinal direction.

According to this structure, the collision load from the front side frame can be securely transmitted to both the first floor upper frame and the second floor upper frame, thereby improving the vehicle-body rigidity. Thereby, the efficiency of the collision-load transmission to the floor panel so improves that the superior frontal-and-SORB collision performance can be attained.

Additionally, it is preferable that the first floor upper frame extend rearward so as to overlap an upper side of the floor lower frame.

Moreover, it is preferable that the front end portion of the first floor upper frame be arranged on a central side, in the vehicle width direction, of the vehicle body relative to the hinge pillar, the inclination portion of the first floor upper frame extend toward the central side, in the vehicle width direction, of the vehicle body from the above-described front end portion, the second floor upper frame extend obliquely rearward-and-outward, in the vehicle width direction, of the vehicle body and connect the front end portion of the first floor upper frame and the hinge pillar, and the connecting member extend in the vehicle width direction and connect the inclination portion of the first floor upper frame and the front end portion of the side sill in the vehicle width direction.

As described above, the lower vehicle-body structure of the vehicle of the present invention can properly attain the suppression of the vibration-energy transmission from the suspension to the vehicle body in addition to the improvement of the impact resistant performance against the collision load generated in the frontal-and-SORB collision of the vehicle.

The present invention will become apparent from the following description which refers to the accompanying drawings.

Figure 6:
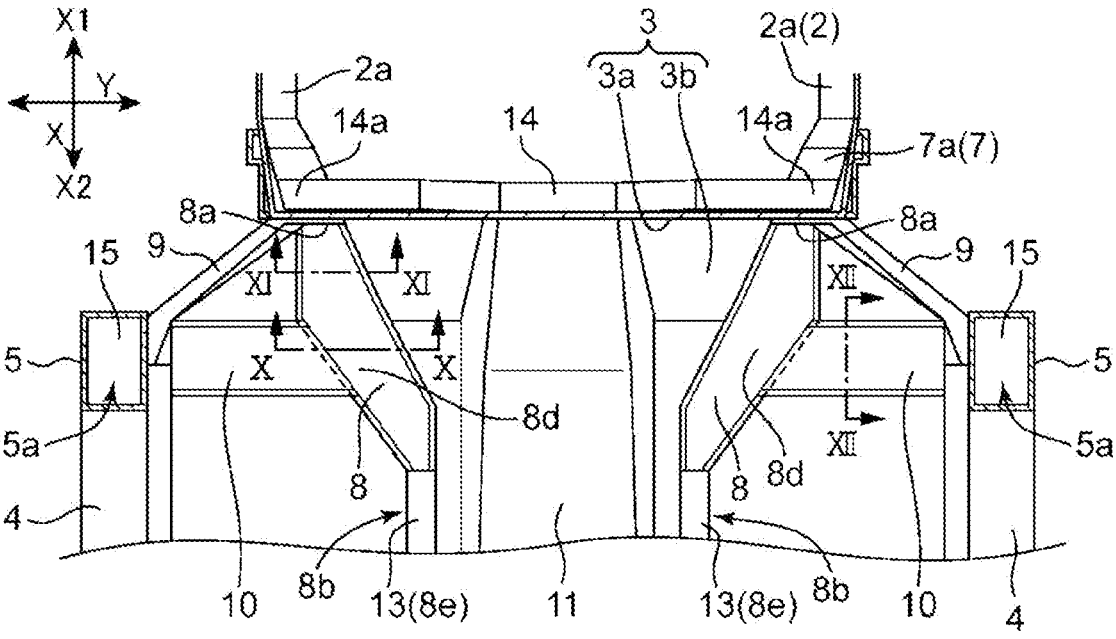
FIG. 6 is an enlarged plan view showing a first upper frame, a second upper frame, and a connecting member connecting the first upper frame and a side sill.
Figure 10:
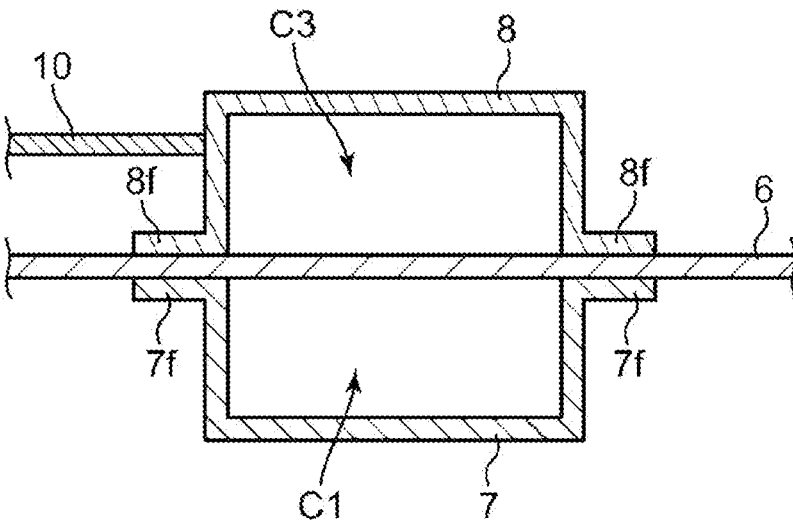

FIG. 10 is a sectional view taken along line X-X of FIG. 6.

Figure 11:
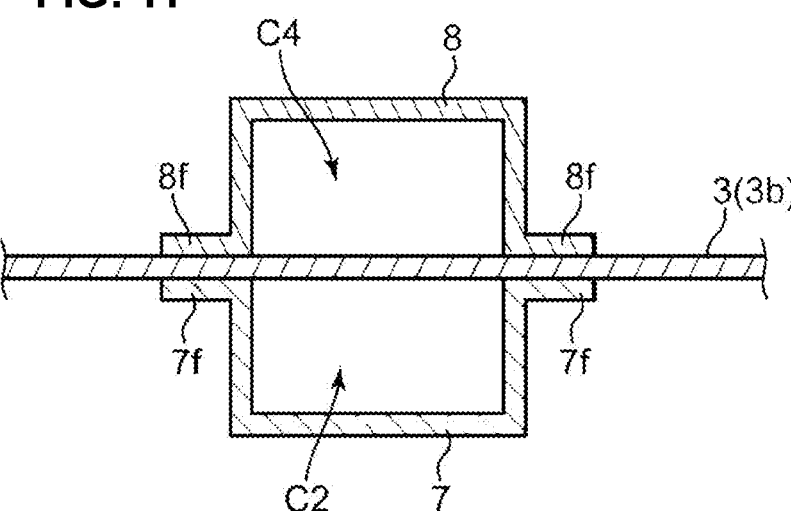

FIG. 11 is a sectional view taken along line XI-XI of FIG. 6.

Figure 12:
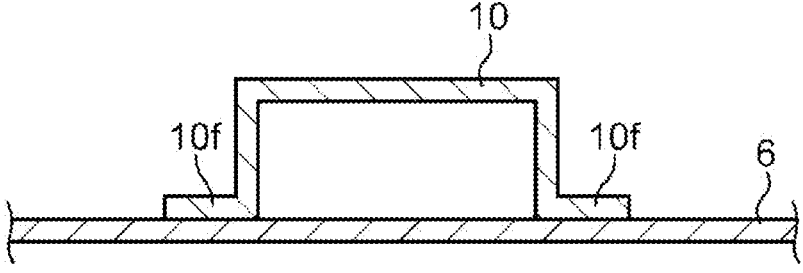

FIG. 12 is a sectional view taken along line XII-XII of FIG. 6.

DETAILED DESCRIPTION OF THE INVENTION

Hereafter, a lower vehicle-body structure of a vehicle according to an embodiment of the present invention will be described specifically referring to the drawings.

As shown in FIGS. 1-8, a vehicle body 1 to which the lower vehicle-body structure of the vehicle according to the embodiment of the present invention is applied comprises, as a whole structure, a pair of front side frames 2 extending in a vehicle longitudinal direction X at both sides, in a vehicle width direction Y, of a front portion (positioned on a front side X1) of the vehicle body 1, a dash panel 3 positioned on the rear side X2 of the pair of front side frames 2, a pair of side sills 4 arranged at both sides of the vehicle body 1 on the rear side X2 of the dash panel 3 and extending in the vehicle longitudinal direction X, a pair of hinge pillars 5 extending in a vertical direction Z at each front end portion 4a of the pair of side sills 4, a floor panel 6 arranged between the pair of side sills 4 and fixed to each of the pair of side sills 4, a floor tunnel 11 protruding upward Z1 at a center, in the vehicle width direction Y, of the floor panel 6 and extending in the vehicle longitudinal direction X, and a dash cross member 14 extending in the vehicle width direction Y along a front face of the dash panel 3 (specifically, a body portion 3a described later). Herein, reference character 21 denotes a bumper beam extending in the vehicle width direction Y and connected to respective front ends of the pair of front side frames 2.

The dash panel 3 is a plate member provided to expand in the vehicle width direction Y on the rear side X2 of the pair of front side frames 2 so as to partition a cabin PR from its outside. More specifically, the dash panel 3 of the present embodiment comprises the body portion 3a extending straight in the vertical direction Z and a kick-up portion 3b extending rearward X2 and downward Z2 from a lower end portion of the body portion 3a (see FIGS. 3 and 7 particularly). The kick-up portion 3b is a portion located near a foot (feet) of a passenger in the cabin PR, and therefore it is preferable that the kick-up portion 3b extend rearward X2 and downward Z2 in a curved shape so as not to interfere with the passenger' foot (feet). A rear end of the kick-up portion 3b and a front end of the floor panel 6 are connected by welding or the like.

Figure 3:
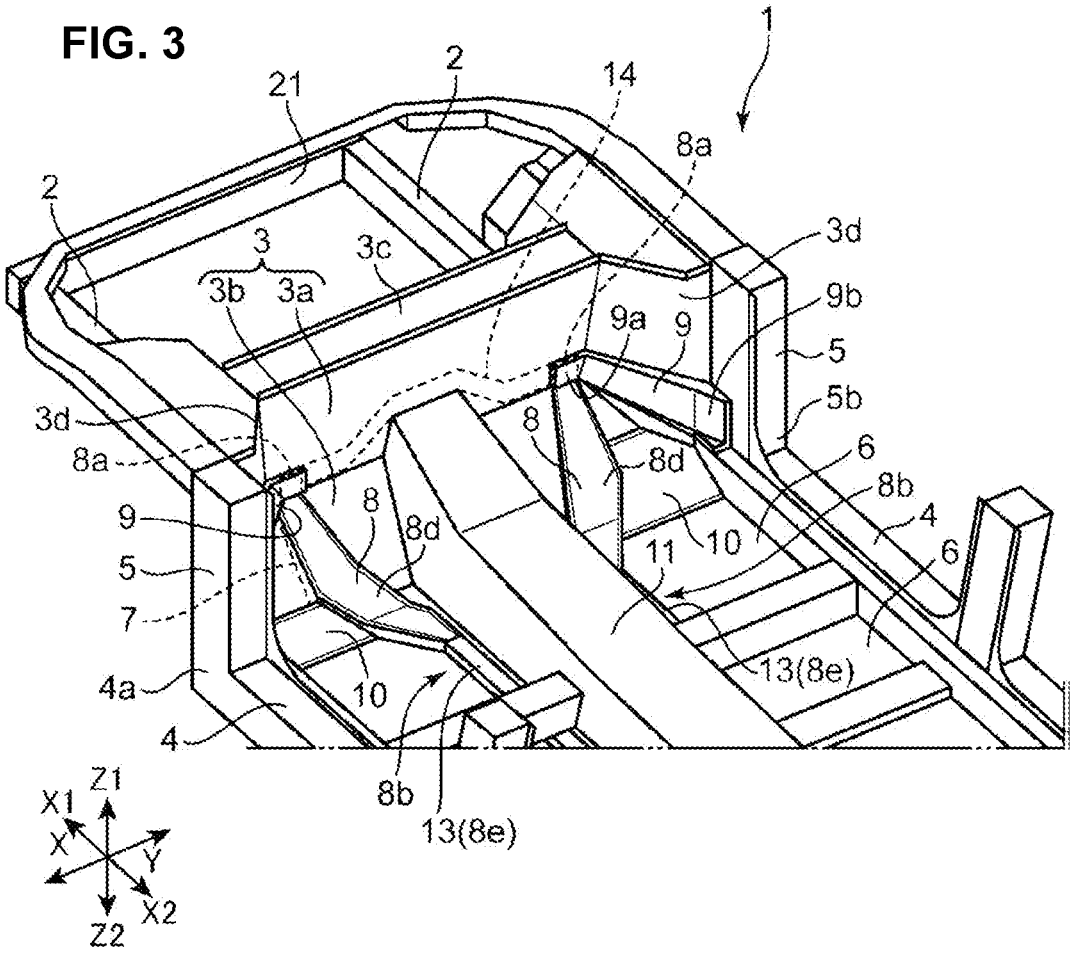
FIG. 3 is a perspective view of the front-side part of the vehicle body of FIG. 1, when viewed from an upper-left rear side of the vehicle.
Figure 4:
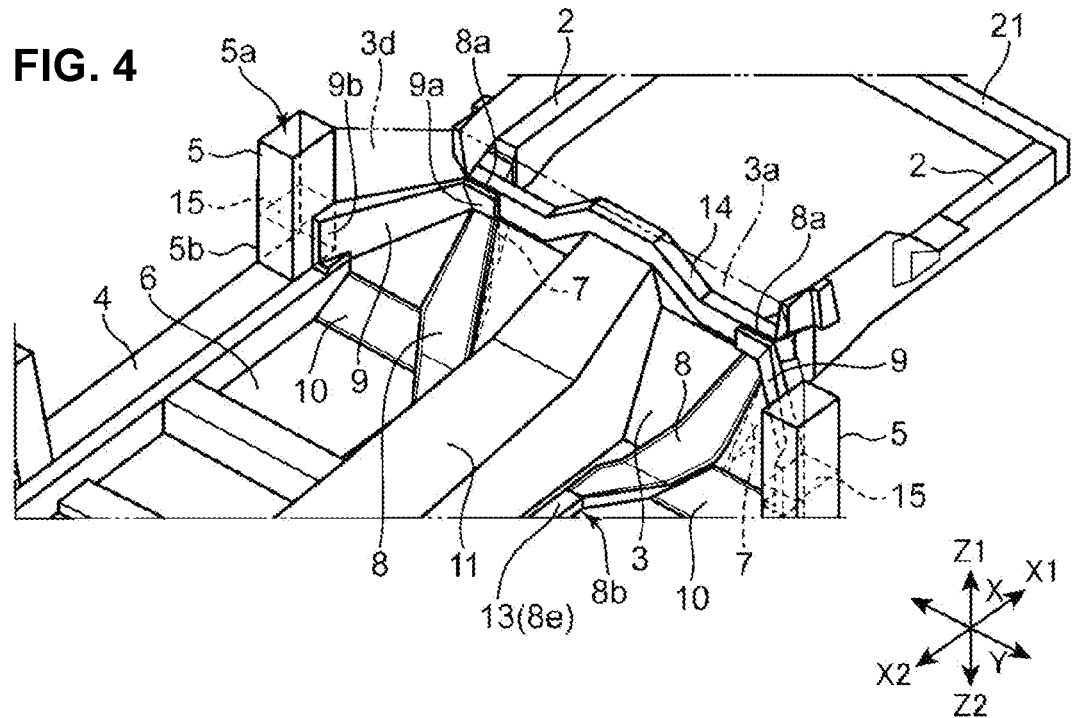
FIG. 4 is a perspective view of the front-side part of the vehicle body of FIG. 1, when viewed from an upper-right rear side of the vehicle.

The dash panel 3 further comprises an upper flange portion 3c extending forward X1 from an upper end of the body portion 3a (see FIGS. 1 and 3) and a pair of side portions 3d expanding obliquely outward, in the vehicle width direction, and rearward X2 between both ends, in a width direction, of the body portion 3a and the hinge pillars 5 (see FIGS. 3 and 4).

The hinge pillar 5 of the present embodiment is a hollow-cylindrical shaped member. A gusset member 15 is provided inside the hinge pillar 5 at a position near a lower end of its inside space portion 5a such that the gusset member 15 partitions the inside space portion 5a in the vertical direction Z.

Figure 7:
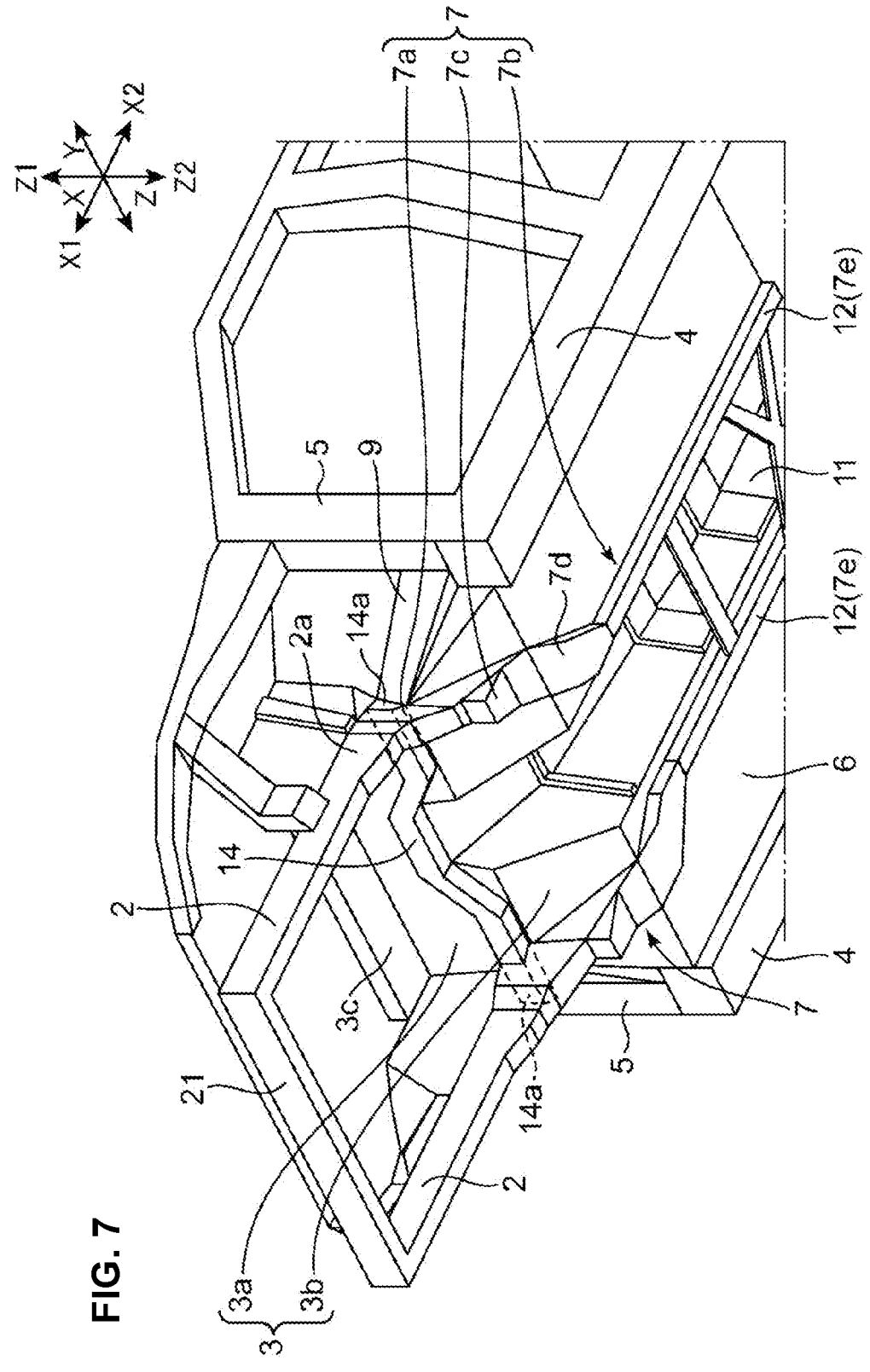
FIG. 7 is a perspective view of the front-side part of the vehicle body of FIG. 1, when viewed from a lower-left front side of the vehicle.
Figure 8:
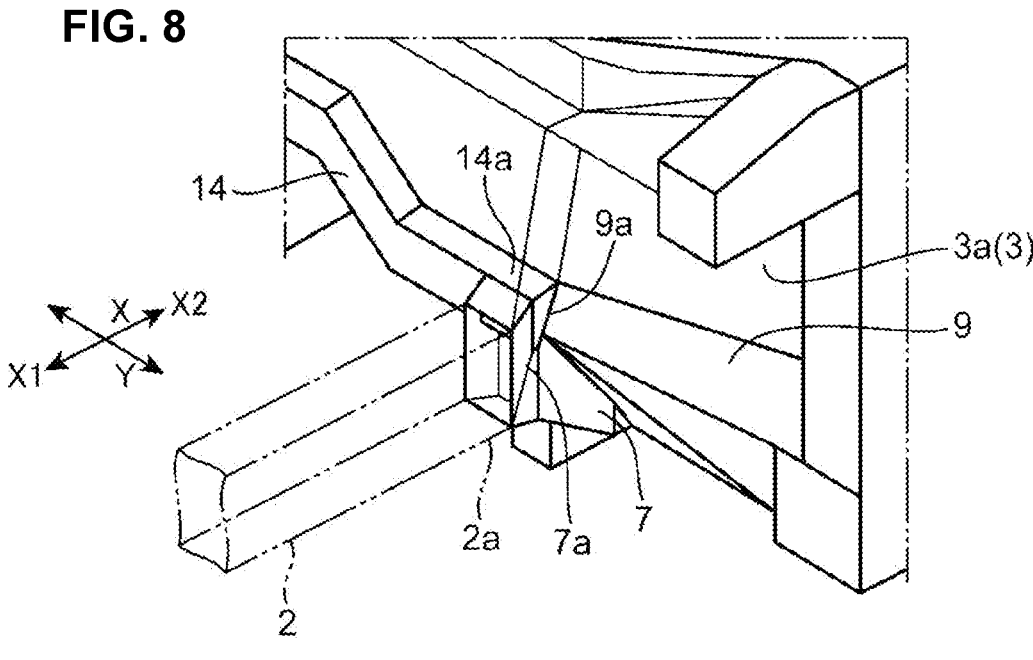
FIG. 8 is an enlarged perspective view showing an area in FIG. 7 where a rear end portion of a front side frame, a front end portion of a first lower frame, and an end portion, in a vehicle width direction, of a dash cross member overlap each other.

Each end portion 14a of both sides, in the vehicle width direction Y, of the dash cross member 14 and a rear end portion 2a of the front side frame 2 are provided to overlap each other in an elevational view (i.e., when viewed from the vehicle front side X1) as shown in FIGS. 7 and 8. Specifically, the dash cross member 14 of the present embodiment penetrates the rear end portion 2a of the front side frame 2. At least a flange portion of the end portion 14a of the dash cross member 14 protrudes outward, in the vehicle width direction, of the vehicle body 1 beyond the front side frame 2.

The vehicle body 1 of the present embodiment further comprises a pair of floor lower frames 7 as a member positioned below the floor panel 6 at both sides of the floor tunnel 11 in order to improve the frontal-and-SORB collision performance of the vehicle body 1. Further, it comprises three kinds of members positioned above the floor panel 6: a pair of first floor upper frame 8: a pair of second floor upper frame 9; and a pair of connecting members 10. Hereafter, these members will be described specifically.

Figure 1:
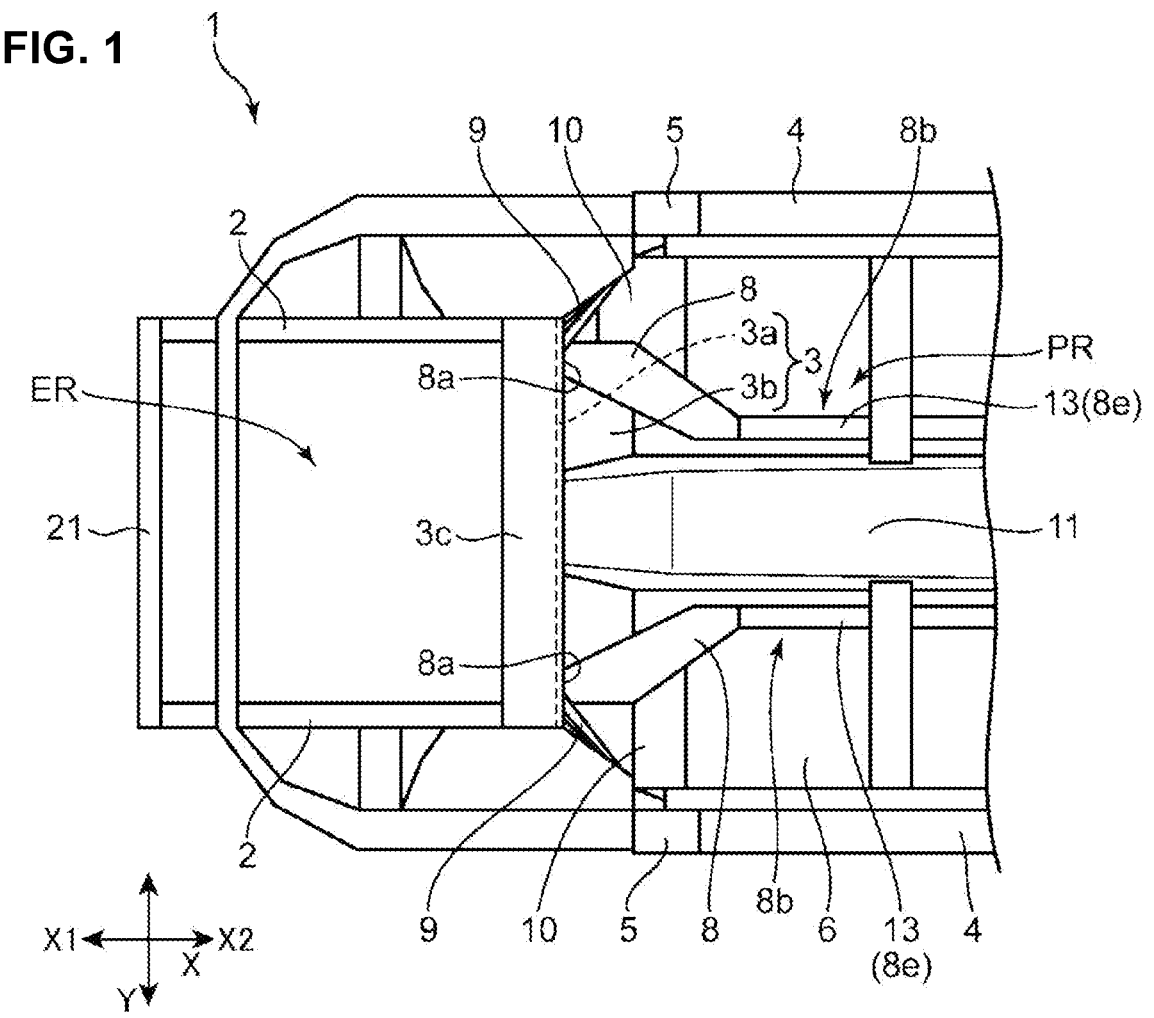
FIG. 1 is a plan view of a front-side part of a vehicle body showing a lower vehicle-body structure of a vehicle according to an embodiment of the present invention.
Figure 2:
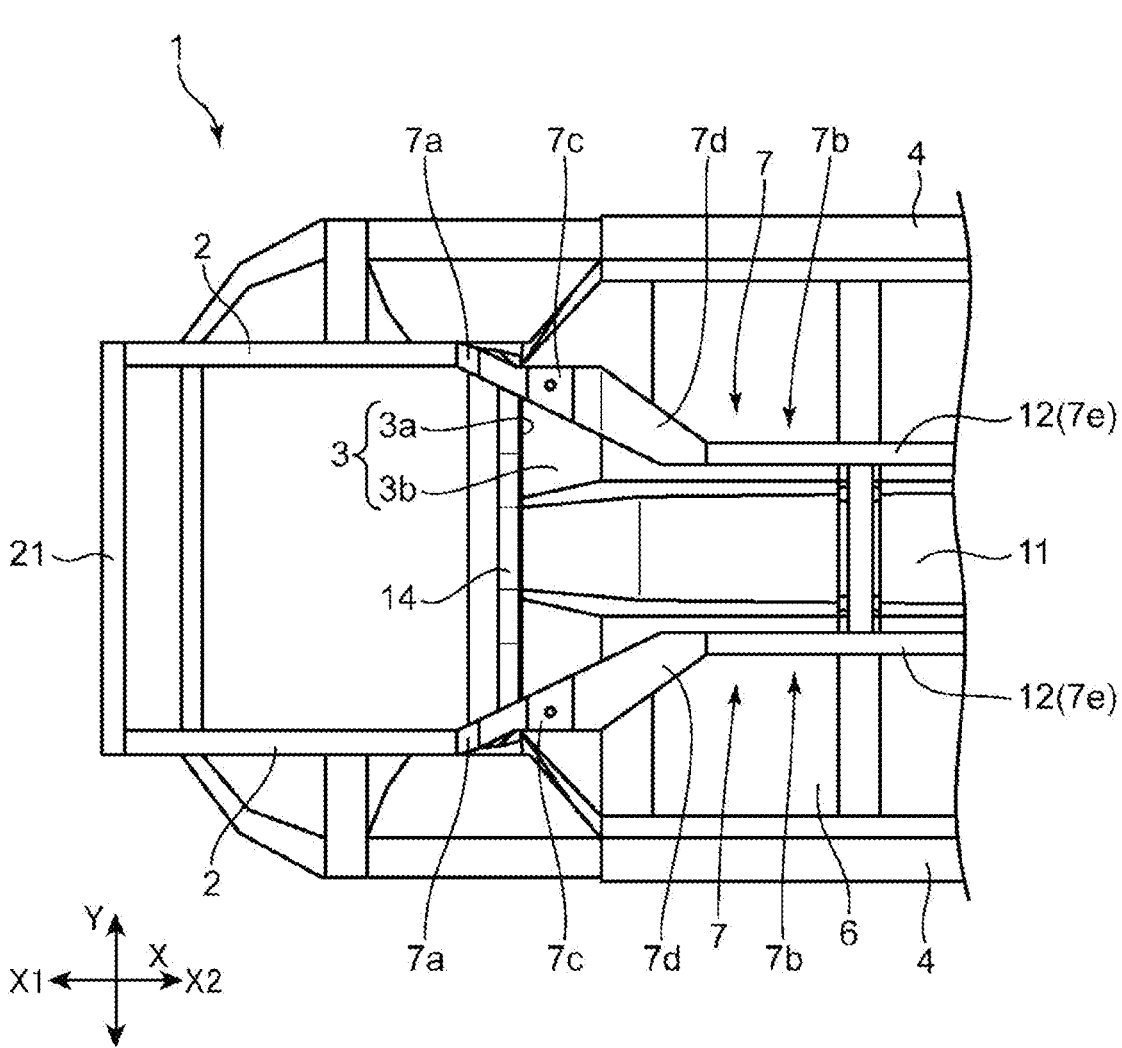
FIG. 2 is a bottom view of the front-side part of the vehicle body of FIG. 1.

The floor lower frame 7 is a member which extends rearward X2 from the rear end portion 2a of the front side frame 2 positioned on the front side X1 of the body portion 3a of the dash panel 3 along a lower face of the kick-up portion 3b and then extends along a lower face of the floor panel 6 as shown in FIGS. 2-11 (FIGS. 2 and 7 particularly). The floor lower frame 7 is a member which has a roughly hat-shaped cross section (a pair of flange portions 7f) so as to respectively form closed-cross sections C1, C2 together with the floor panel 6 and the kick-up portion 3b of the dash panel 3 at a position below the floor panel 6 (see FIGS. 10 and 11).

As shown in FIGS. 1 and 3-11, the floor lower frame 7 specifically comprises a front end portion 7a which is fixed to each rear end of the pair of front side frames 2 by welding or the like, a rear end portion 7b which extends rearward X2 below the floor panel 6 and is fixed to the lower face of the floor panel 6 by welding or the like, and a fixation portion 7c which is arranged between the front end portion 7a and the rear end portion 7b and where a suspension (not illustrated) of the vehicle is fixed. The fixation portion 7c includes some elements for fixing the suspension, such as a flat face which is directed downward Z2, a bolt hole which is formed at this flat face, and any other necessary structural portions.

The floor lower frame 7 further comprises an inclination portion 7d which is inclined toward a central side, in the vehicle width direction Y, thereof as it goes rearward X2 from the front end portion 7a and a linear portion 7e which extends rearward X2, in the vehicle longitudinal direction X, from a rear end of the inclination portion 7d. In the present embodiment, the rear end portion 7b of the floor lower frame 7 is constituted by the linear portion 7e, but any other shape than linear may be applicable for this rear end portion 7b.

In the present embodiment, the linear portion 7e of the floor lower frame 7 is constituted by the tunnel side member 12 which extends rearward X2 along both-side ends of the floor tunnel 11 below the floor panel 6.

Figure 9:
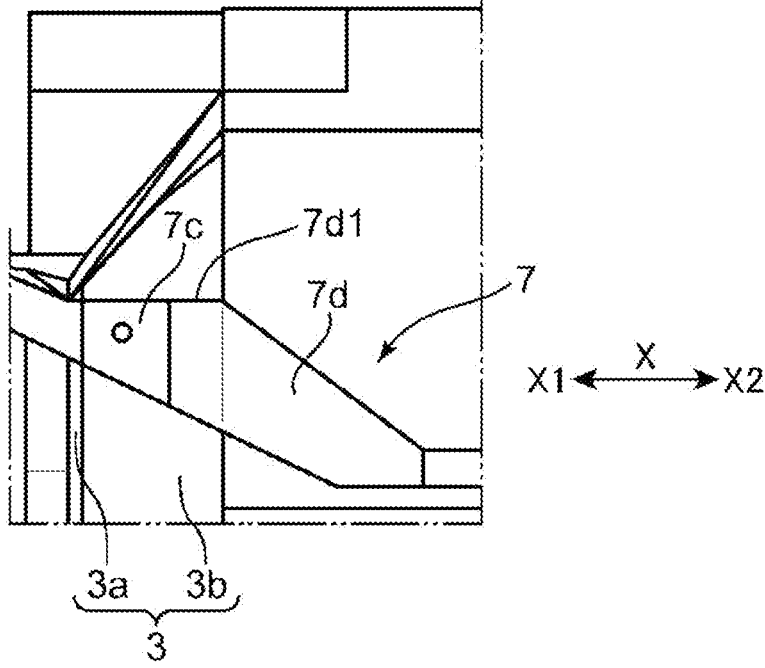
FIG. 9 is an enlarged bottom view showing that an inclination portion of the first lower frame shown in FIG. 7 has a section which extends rearward in a vehicle longitudinal direction on the rear side of a fixation portion.

As shown in FIG. 9, a portion of the inclination portion 7d of the floor lower frame 7 which is positioned right behind the fixation portion 7c for the suspension has a portion 7d1 which extends in the vehicle longitudinal direction X. Accordingly, this portion is formed such that its width is partially enlarged, thereby improving the bending rigidity.

As shown in FIGS. 1 and 3-6, the first floor upper frame 8 is a member which is arranged inside the cabin PR, extends along the floor lower frame 7 above the floor lower frame 7, and has a roughly hat-shaped cross section (a pair of flange portions 8f shown in FIGS. 10 and 11) so as to respectively form closed-cross sections C3, C4 together with the floor panel 6 and the kick-up portion 3b of the dash panel 3 (see FIGS. 10 and 11). The first floor upper frame 8 is fixed to the kick-up portion 3b of the dash panel 3 and an upper face of the floor panel 6 by welding or the like.

Inside the cabin PR, the first floor upper frame 8 extends rearward X2 from a rear-side face of the body portion 3a of the dash panel 3 along an upper face of the kick-up portion 3b such that it overlaps an upper side of the floor lower frame 7, and then extends along the upper face of the floor panel.

The first floor upper frame 8 comprises a front end portion 8a which is fixed to the dash panel 3 on the rear side X2 of the front side frame 2 by welding or the like and a rear end portion 8b which is fixed to the upper face of the floor panel 6 by welding or the like.

Further, similarly to the floor lower frame 7, the first floor upper frame 8 has a portion which is inclined toward the central side, in the vehicle width direction, of the vehicle body 1 as it goes toward the vehicle rear side X2.

Specifically, the first floor upper frame 8 comprises an inclination portion 8d and a linear portion 8e which respectively correspond to the inclination portion 7d and the linear portion 7e of the floor lower frame 7. That is, the first floor upper frame 8 comprises the inclination portion 8d which is inclined toward a central side, in the vehicle width direction Y, thereof as it goes rearward X2 from the front end portion 8a and the linear portion 8e which extends rearward X2, in the vehicle longitudinal direction X, from a rear end of the inclination portion 8d. In the present embodiment, the rear end portion 8b of the first floor upper frame 8 is constituted by the linear portion 8e, but any other shape than linear may be applicable for this rear end portion 8b.

In the present embodiment, the linear portion 8e of the first floor upper frame 8 is constituted by a tunnel side member 13 which extends rearward X2 along both-side ends of the floor tunnel 11 above the floor panel 6.

The second floor upper frame 9 is a member which is arranged inside the cabin PR, i.e., on the rear side X2 of the body portion 3a of the dash panel 3, and has a roughly hat-shaped cross section, which is similar to the first floor upper frame 8. The second floor upper frame 9 extends along the side portion 3d which is inclined toward a rear side of each of the both sides of the body portion 3a of the dash panel 3 and connects the dash panel 3 and the hinge pillar 5 on the rear side X2 of the front side frame 2. The second floor upper frame 9 comprises a front end portion 9a which is fixed to the body portion 3a of the dash panel 3 by welding or the like in a state where it overlaps the front end portion 8a of the first floor upper frame 8 and a rear end portion 9b which is fixed to a lower end 5b of the hinge pillar 5 by welding or the like.

Accordingly, in the present embodiment, the front end portion 8a of the first floor upper frame 8 and the front end portion 9a of the second floor upper frame 9 which is fixed to the dash panel 3 take an overlapping position in the vehicle longitudinal direction X. Herein, a section of the second floor upper frame 9 which is positioned between the front end portion 9a and the rear end portion 9b is fixed to the side portion 3d of the dash panel 3 by welding or the like in the present embodiment, but this is not a necessary structure in the present invention.

As shown in FIG. 8, the end portion 14a positioned at each side of the both-sides, in the vehicle width direction Y, of the dash cross member 14 and the front end portion 9a of the second floor upper fame 9 which is fixed to the dash panel 3 are provided to overlap each other in the elevational view.

Figure 5:
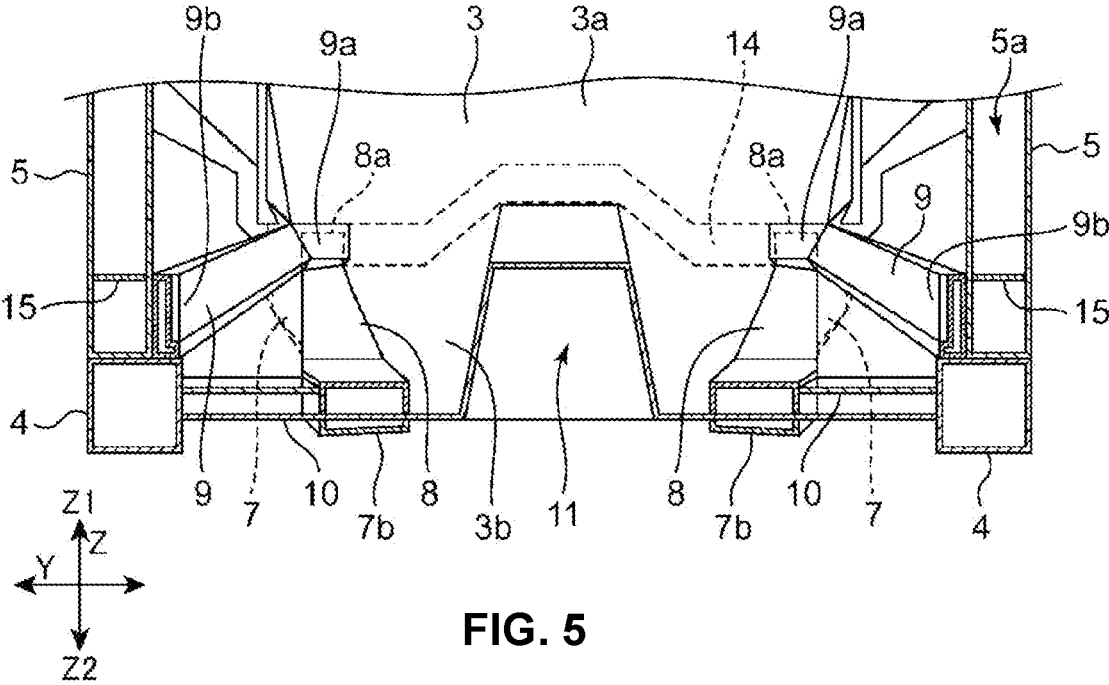
FIG. 5 is a sectional explanatory view of the front-side part of the vehicle body of FIG. 1, when viewed from a rear side of the vehicle.

As shown in FIGS. 4 and 5, the rear end portion 9*b* of the second floor upper frame 9 is fixed to a position of the hinge pillar 5 where the gusset member 15 is arranged.

As shown in FIGS. 2-6 and 12, the connecting member 10 (so-called torque box) is a member which is arranged inside the cabin PR, i.e., on the rear side of the body portion 3*a* of the dash panel 3, and extends in the vehicle width direction Y along the floor panel 6 at the both sides of the floor tunnel 11. The connecting member 10 has a roughly hat-shaped cross section protruding upward Z1 of the floor panel 6 (i.e., the cross section having a pair of flange portions 10*f* shown in FIG. 12). The connecting member 10 is fixed by welding or the like to the upper face of the floor panel 6 at its flange portion 10*f*, and thereby forms a closed-cross section together with the floor panel 6.

The connecting member 10 connects the first floor upper frame 8 and the front end portion 4*a* of the side sill 4 in the vehicle width direction Y at its both-end portions fixed to these portions by welding or the like at a position on the upward side Z1 of floor panel 6.

As shown in FIG. 6, the first floor upper frame 8, the second floor upper frame 9, and the connecting member 10 are arranged in a triangular shape in the plan view. Specifically, these members 8, 9, 10 are arranged as described below. That is, the front end portion 8*a* of the first floor upper frame 8 is arranged on the central side, in the vehicle width direction Y, of the vehicle body 1 relative to the hinge pillar 5. The inclination portion 8*d* of the first floor upper frame 8 extends toward the central side, in the vehicle width direction, of the vehicle body 1 from the front end portion 8*a*. The second floor upper frame 9 extends obliquely rearward X2-and-outward, in the vehicle width direction Y, of the vehicle body 1, and connects the front end portion 8*a* of the first floor upper frame 8 and the hinge pillar 5. As described above, the connecting member 10 extends in the vehicle width direction Y and connects the inclination portion 8*d* of the first floor upper frame 8 and the front end portion 4*a* of the side sill 4 in the vehicle width direction Y. Thereby, a truss structure (i.e., a triangle frame structure) is possibly formed in the plan view by the first floor upper frame 8, the second floor upper frame 9, and the connecting member 10.

(Features of Present Embodiment)

(1)

In the lower vehicle-body structure of the vehicle of the present embodiment, the vehicle body 1 comprises, as described above, the pair of front side frames 2, the dash panel 3, the pair of side sills 4, the pair of hinge pillar 5, and the floor panel 6, and further comprises the pair of floor lower frames 7, the pair of first floor upper frames 8, the pair of second floor upper frames 9, and the pair of connecting members 10 (torque boxes)

The floor lower frame 7 has the front end portion 7*a* which is fixed to each rear end of the pair of front side frames 2, the rear end portion 7*b* which extends rearward X2 at the position below the floor panel 6 and is fixed to the lower face of the floor panel 6, and the fixation portion 7*c* which is arranged between the front end portion 7*a* and the rear end portion 7*b* and where the suspension of the vehicle is fixed.

The first floor upper frame 8 has the front end portion 8*a* which is fixed to the dash panel 3 on the rear side X2 of the front side frame 2 and the rear end portion 8*b* which is fixed to the upper face of the floor panel 6, and is positioned above, i.e., on the upward side Z1 of the floor panel 6 and extends along the floor lower frame 7.

The second floor upper frame 9 connects the dash panel 3 and the hinge pillar 5 on the rear side X2 of the front side frame 2.

The connecting member 10 connects the first floor upper frame 8 and the front end portion 4*a* of the side sill 4 in the vehicle width direction Y on the upward side Z1 of the floor panel 6.

According to this structure, the collision load received at the front side frame 2 in the vehicle frontal collision is transmitted to the first floor upper frame 8 and the second floor upper frame 9 inside the cabin PR positioned on the rear side X2 of the dash panel 3 and above the floor panel 6. Thus, the collision load transmitted from the front side frame 2 can be transmitted in the in-plane direction through two routes of the first floor upper frame 8 and the second floor upper frame 9 in a dispersion manner, so that the superior frontal collision performance (i.e., the high impact resistant performance against the vehicle frontal collision) can be attained.

Specifically, the first floor upper frame 8 transmits, in corporation with the floor lower frame 7, the collision load to a portion of the floor panel 6 near the floor tunnel 11 arranged at the central side of the floor panel 6, and also the second floor upper frame 9 transmits the collision load to another portion of the floor panel near the side sill 4 arranged at the each of the both-side ends of the floor panel 6 by way of the hinge pillar 5 and the side sill 4. Thereby, the collision load can be transmitted to the floor panel 6 in the in-plane direction over a large area in the dispersion manner.

Further, the connecting member 10 connects the first floor upper frame 8 and the side sill 4 in the vehicle width direction Y inside the cabin PR. Therefore, since the reaction force of the vehicle width direction Y is generated when the collision load of the vehicle width direction Y is inputted to the front end of the side sill 4 in the SORB, the superior SORB collision performance (i.e., the high impact resistant performance against the SORB) can be attained as well.

Additionally, the connecting member 10 of the above-described structure connects the first floor upper frame 8 and the side sill 4 at the position which is offset, in the vertical direction Z, from the fixation portion 7*c* of the floor lower frame 7 where the suspension is fixed. Therefore, the collision load of the vehicle width direction Y inputted to the floor lower frame 7 from the suspension fixed to the fixation portion 7*c* can be suppressed from being transmitted to any other vehicle-body constituting components, such as the side sill 4 or the floor panel 6. Thus, the suppression of the vibration-energy transmission from the suspension to the vehicle body 1 can be attained.

(2)

In the lower vehicle-body structure of the vehicle of the present embodiment, the floor lower frame 7 and the first floor upper frame 8 respectively have the inclination portions 7*d*, 8*d* which are inclined toward the center, in the vehicle width direction Y, thereof as they go rearward X2 from the front end portions 7*a*, 8*a* and the linear portions 7*e*, 8*e* which extend rearward X2, in the vehicle longitudinal direction X, from the rear ends of the inclination portions 7*d*, 8*d*.

According to this structure, the floor lower frame 7 and the first floor upper frame 8 are respectively configured in a shape where they are bent at borders between the inclination portions 7*d*, 8*d* and the linear portions 7*e*, 8*e*, i.e., in a roughly V shape in the plan view, and the linear portions 7*e*, 8*e* are respectively positioned away from the second floor upper frame 9. Therefore, the collision load can be transmitted over a large area of the floor panel 6 on the rear side X2 of the front side frame 2.

(3)

In the lower vehicle-body structure of the vehicle of the present embodiment, the vehicle body 1 further comprises the floor tunnel 11 which protrudes upward Z1 at the center, in the vehicle width direction Y, of the floor panel 6 and extends in the vehicle longitudinal direction X. The linear portions 7e, 8e of the floor lower frame 7 and the first floor upper frame 8 are respectively constituted by the tunnel side members 12, 13 which extend rearward X2 along the both-side ends of the floor tunnel 11.

According to this structure, since the linear portions 7e, 8e are respectively located at the furthest position from the second floor upper frame 9 in the section of the floor panel 6 between the side sill 4 and the floor tunnel 11, the collision load can be transmitted over the largest area of the floor panel 6 on the rear side X2 of the front side frame 2. Moreover, since the linear portions 7e, 8e extend in the vehicle longitudinal direction X (rearward X2) along the both-side ends of the floor tunnel 11, the floor tunnel 11 can be reinforced, too.

(4)

In the lower vehicle-body structure of the vehicle of the present embodiment, the floor lower frame 7 and the first floor upper frame 8 respectively form the closed-cross sections C1, C2 together with the floor panel 6, and also form the closed-cross sections C3, C4 together with the kick-up portion 3b of the dash panel 3.

According to this structure, since the floor lower frame 7 and the first floor upper frame 8 extending along the floor lower frame 7 form the closed-cross sections C1-C4 together with the floor panel 6 and the kick-up portion 3b of the dash panel 3, respectively, the rigidity of the floor lower frame 7 and the first floor upper frame 8 increases, thereby improving the frontal-and-SORB collision performance.

(5)

In the lower vehicle-body structure of the vehicle of the present embodiment, the dash panel 3 has the body portion 3a which extends straight in the vertical direction Z and the kick-up portion 3b which extends rearward X2 and downward Z2 from the lower end portion of the body portion 3a. The front end portion 8a of the first floor upper frame 8 and the front end portion 9a of the second floor upper frame 9 are fixed to the body portion 3a of the dash panel 3 in the state where both of the front end portions 8a, 9a overlap each other.

According to this structure, since the collision load is transmitted in the vehicle longitudinal direction X from the body portion 3a extending in the vertical direction Z of the dash panel 3 to the first floor upper frame 8 and the second floor upper frame 9 in the vehicle frontal collision or the SORB, the efficiency of the load transmission to the first floor upper frame 8 and the second floor upper frame 9 improves. Moreover, since the first floor upper frame 8 and the second floor upper frame 9 are fixed to the body portion 3a in the overlapping state, the collision load is not easily transmitted to the kick-up portion 3b positioned away from the body portion 3a, so that deformation of the kick-up portion 3b can be suppressed.

(6)

In the lower vehicle-body structure of the vehicle of the present embodiment, the dash cross member 14 extending in the vehicle width direction Y along the front face of the dash panel 3 is further provided. The end portion 14a of each of the both sides, in the vehicle width direction Y, of the dash cross member 14 and the front end portion 9a of the second floor upper frame 9 which is fixed to the dash panel 3 are provided to overlap each other in the elevational view.

According to this structure, since the end portion 14a of each of the both sides, in the vehicle width direction Y, of the dash cross member 14 and the front end portion 9a of the second floor upper frame 9 which is fixed to the dash panel 3 are provided to overlap each other in the elevational view, the collision load received at the dash cross member 14 can be securely transmitted to the hinge pillar 5 and the side sill 4 by way of the second floor upper frame 9, thereby improving the vehicle-body rigidity.

(7)

In the lower vehicle-body structure of the vehicle of the present embodiment, the end portion 14a of each of the both sides, in the vehicle width direction Y, of the dash cross member 14 is provided to overlap the rear end portion 2a of the front side frame 2 in the elevational view. According to this structure, the collision load can be securely transmitted to both the dash cross member 14 and the second floor upper frame 9 from the front side frame 2, thereby improving the vehicle-body rigidity.

(8)

In the lower vehicle-body structure of the vehicle of the present embodiment, the first floor upper frame 8, the second floor upper frame 9, and the connecting member 10 are arranged in the triangular shape in the plan view. According to this structure, since a truss structure (i.e., a triangle frame structure) is formed in the plan view by the first floor upper frame 8, the second floor upper frame 9, and the connecting member 10, the collision-load transmission efficiency can be improved.

(9)

In the lower vehicle-body structure of the vehicle of the present embodiment, the hinge pillar 5 is the hollow-cylindrical shaped member. It includes the gusset member 15 which is positioned near the lower end of the space portion 5a inside the hinge pillar 5 such that the gusset member 15 partitions the space portion 5a in the vertical direction Z. The rear end portion 9b of the second floor upper frame 9 is fixed at the position of the hinge pillar 5 where the gusset member 15 is provided.

According to this structure, since the position of the hinge pillar 5 where the gusset member 15 is provided shows the highest rigidity, the second floor upper frame 9 is fixed to this position with the highest rigidity, so that the superior frontal-and-SORB collision performance can be attained.

(10)

In the lower vehicle-body structure of the vehicle of the present embodiment, the front end portion 8a of the first floor upper frame 8 and the front end portion 9a of the second floor upper frame 9 which is fixed to the dash panel 3 are provided to overlap each other in the vehicle longitudinal direction X.

According to this structure, the collision load from the front side frame can be securely transmitted to both the first floor upper frame 8 and the second floor upper frame 9 in the disperse manner. Thereby, the efficiency of the collision-load transmission to the floor panel 6 so improves that the superior frontal-and-SORB collision performance can be attained.

Additionally, in the lower vehicle-body structure of the vehicle of the present embodiment, the first floor upper frame 8 extends rearward X2 so as to overlap an upper side of the floor lower frame 7.

Moreover, the front end portion 8a of the first floor upper frame 8 is arranged on the central side, in the vehicle width direction Y, of the vehicle body 1 relative to the hinge pillar 5, the inclination portion 8*d* of the first floor upper frame 8 extends toward the central side, in the vehicle width direction Y, of the vehicle body 1 from the front end portion 8*a*, the second floor upper frame 9 extends obliquely rearward X2-and-outward, in the vehicle width direction Y, of the vehicle body 1 and connects the front end portion 8*a* of the first floor upper frame 8 and the hinge pillar 5, and the connecting member 10 extends in the vehicle width direction Y and connects the inclination portion 8*d* of the first floor upper frame 8 and the front end portion 4*a* of the side sill 4 in the vehicle width direction Y.

(Modified Examples)

(A)

While the front end portion 8*a* of the first floor upper frame 8 and the front end portion 9*a* of the second floor upper frame 9 are provided to overlap each other in the vehicle longitudinal direction X in the above-described embodiment, the present invention is not to be limited to this structure. In the present invention, the front end portion 9*a* of the second floor upper frame 9 may be fixed to the dash panel 3 at a position away from the front end portion 8*a* of the first floor upper frame 8 in the vehicle width direction Y or in the vertical direction Z as long as the second floor upper frame 9 connects the dash panel 3 and the hinge pillar 5 on the rear side X2 of the front side frame 2.

(B)

While the floor lower frame 7 and the first floor upper frame 8 respectively have the linear portions 7*e*, 8*e* which extend rearward X2, in the vehicle longitudinal direction X, from the rear ends of the inclination portions 7*d*, 8*d* in the above-described embodiment, the linear portions 7*e*, 8*e* may be omitted from the present structure (e.g., the inclination portions 7*d*, 8*d* are only provided). In this case, the collision load can be dispersed in the in-plane direction of the floor panel 6 as well. However, the structure of the above-described embodiment in which the floor lower frame 7 and the first floor upper frame 8 respectively have both the inclination portions 7*d*, 8*d* and the linear portions 7*e*. 8*e* may be preferable in transmitting the collision load over the larger area of the floor panel 6 on the rear side X2 of the front side frame 2.

What is claimed is:

1. A lower vehicle-body structure of a vehicle, comprising:

a pair of front side frames extending in a vehicle longitudinal direction at both sides, in a vehicle width direction, of a vehicle-body front portion;

a dash panel positioned on a rear side of the pair of front side frames and partitioning a cabin from outside;

a pair of side sills arranged at both sides of a vehicle body on the rear side of the dash panel and extending in the vehicle longitudinal direction;

a pair of hinge pillars extending in a vertical direction at each front end portion of the pair of side sills;

a floor panel arranged between the pair of side sills and fixed to each of the pair of side sills;

a floor lower frame having a front end portion which is fixed to each rear end of the pair of front side frames, a rear end portion which extends rearward at a position below the floor panel and is fixed to a lower face of the floor panel, and a fixation portion which is arranged between said front end portion and said rear end portion and where a suspension of the vehicle is fixed;

a first floor upper frame positioned above the floor panel and extending along the floor lower frame, the first floor upper frame having a front end portion which is fixed to the dash panel on the rear side of the front side frame and a rear end portion which is fixed to an upper face of the floor panel;

a second floor upper frame connecting the dash panel and the hinge pillar on the rear side of the front side frame; and a connecting member connecting the first floor upper frame and the front end portion of the side sill in the vehicle width direction at a position above the floor panel;

wherein each of said floor lower frame and said first floor upper frame has an inclination portion which is inclined toward a center, in the vehicle width direction, thereof as it goes rearward from the front end portion thereof and a linear portion which extends rearward, in the vehicle longitudinal direction, from a rear end of said inclination portion.

2. The lower vehicle-body structure of the vehicle of claim 1, further comprising a floor tunnel protruding upward at a center, in the vehicle width direction, of the floor panel and extending in the vehicle longitudinal direction, wherein said linear portion of each of the floor lower frame and the first floor upper frame is constituted by a tunnel side member which extends rearward along each of both-side ends of said floor tunnel.

3. The lower vehicle-body structure of the vehicle of claim 2, wherein each of said floor lower frame and said first floor upper frame forms a closed-cross section together with said floor panel.

4. The lower vehicle-body structure of the vehicle of claim 2, wherein said dash panel has a body portion which extends in the vertical direction and a kick-up portion which extends rearward and downward from a lower end portion of said body portion, and the front end portion of said first floor upper frame and a front end portion of said second floor upper frame are fixed to the body portion of said dash panel in a state where both of the front end portions overlap each other.

5. The lower vehicle-body structure of the vehicle of claim 2, further comprising a dash cross member extending in the vehicle width direction along a front face of said dash panel, wherein an end portion of each of both sides, in the vehicle width direction, of said dash cross member and a front end portion of said second floor upper frame which is fixed to said dash panel are provided to overlap each other in an elevational view.

6. The lower vehicle-body structure of the vehicle of claim 5, wherein said end portion of each of both sides, in the vehicle width direction, of the dash cross member is provided to overlap a rear end portion of said front side frame in the elevational view.

7. The lower vehicle-body structure of the vehicle of claim 2, wherein said first floor upper frame, said second floor upper frame, and said connecting member are arranged in a triangular shape in a plan view.

8. The lower vehicle-body structure of the vehicle of claim 2, wherein said hinge pillar is a hollow-cylindrical shaped member and includes a gusset member which is positioned near a lower end of an inside space portion thereof such that the gusset member partitions said inside space portion in the vertical direction, and a rear end portion of said second floor upper frame is fixed at a position of the hinge pillar where said gusset member is provided.

9. The lower vehicle-body structure of the vehicle of claim 2, wherein said front end portion of the first floor upper frame and a front end portion of said second floor upper frame which is fixed to said dash panel are provided to overlap each other in the vehicle longitudinal direction.

10. The lower vehicle-body structure of the vehicle of claim 1, wherein each of said floor lower frame and said first floor upper frame forms a closed-cross section together with said floor panel.

11. The lower vehicle-body structure of the vehicle of claim 1, wherein said dash panel has a body portion which extends in the vertical direction and a kick-up portion which extends rearward and downward from a lower end portion of said body portion, and the front end portion of said first floor upper frame and a front end portion of said second floor upper frame are fixed to the body portion of said dash panel in a state where both of the front end portions overlap each other.

12. A lower vehicle-body structure of a vehicle, comprising:

a pair of front side frames extending in a vehicle longitudinal direction at both sides, in a vehicle width direction, of a vehicle-body front portion;

a dash panel positioned on a rear side of the pair of front side frames and partitioning a cabin from outside;

a pair of side sills arranged at both sides of a vehicle body on the rear side of the dash panel and extending in the vehicle longitudinal direction;

a pair of hinge pillars extending in a vertical direction at each front end portion of the pair of side sills;

a floor panel arranged between the pair of side sills and fixed to each of the pair of side sills;

a floor lower frame having a front end portion which is fixed to each rear end of the pair of front side frames, a rear end portion which extends rearward at a position below the floor panel and is fixed to a lower face of the floor panel, and a fixation portion which is arranged between said front end portion and said rear end portion and where a suspension of the vehicle is fixed;

a first floor upper frame positioned above the floor panel and extending along the floor lower frame, the first floor upper frame having a front end portion which is fixed to the dash panel on the rear side of the front side frame and a rear end portion which is fixed to an upper face of the floor panel;

a second floor upper frame connecting the dash panel and the hinge pillar on the rear side of the front side frame;

a connecting member connecting the first floor upper frame and the front end portion of the side sill in the vehicle width direction at a position above the floor panel; and a dash cross member extending in the vehicle width direction along a front face of said dash panel, wherein an end portion of each of both sides, in the vehicle width direction, of said dash cross member and a front end portion of said second floor upper frame which is fixed to said dash panel are provided to overlap each other in an elevational view.

13. The lower vehicle-body structure of the vehicle of claim 1, wherein said first floor upper frame, said second floor upper frame, and said connecting member are arranged in a triangular shape in a plan view.

14. A lower vehicle-body structure of a vehicle, comprising:

a pair of front side frames extending in a vehicle longitudinal direction at both sides, in a vehicle width direction, of a vehicle-body front portion;

a dash panel positioned on a rear side of the pair of front side frames and partitioning a cabin from outside;

a pair of side sills arranged at both sides of a vehicle body on the rear side of the dash panel and extending in the vehicle longitudinal direction;

a pair of hinge pillars extending in a vertical direction at each front end portion of the pair of side sills;

a floor panel arranged between the pair of side sills and fixed to each of the pair of side sills;

a floor lower frame having a front end portion which is fixed to each rear end of the pair of front side frames, a rear end portion which extends rearward at a position below the floor panel and is fixed to a lower face of the floor panel, and a fixation portion which is arranged between said front end portion and said rear end portion and where a suspension of the vehicle is fixed;

a first floor upper frame positioned above the floor panel and extending along the floor lower frame, the first floor upper frame having a front end portion which is fixed to the dash panel on the rear side of the front side frame and a rear end portion which is fixed to an upper face of the floor panel;

a second floor upper frame connecting the dash panel and the hinge pillar on the rear side of the front side frame; and a connecting member connecting the first floor upper frame and the front end portion of the side sill in the vehicle width direction at a position above the floor panel;

wherein said hinge pillar is a hollow-cylindrical shaped member and includes a gusset member which is positioned near a lower end of an inside space portion thereof such that the gusset member partitions said inside space portion in the vertical direction, and a rear end portion of said second floor upper frame is fixed at a position of the hinge pillar where said gusset member is provided.

15. The lower vehicle-body structure of the vehicle of claim 1, wherein said front end portion of the first floor upper frame and a front end portion of said second floor upper frame which is fixed to said dash panel are provided to overlap each other in the vehicle longitudinal direction.

16. The lower vehicle-body structure of the vehicle of claim 1, wherein said first floor upper frame extends rearward so as to overlap an upper side of said floor lower frame.

17. The lower vehicle-body structure of the vehicle of claim 7, wherein said front end portion of the first floor upper frame is arranged on a central side, in the vehicle width direction, of the vehicle body relative to said hinge pillar, said inclination portion of the first floor upper frame extends toward the central side, in the vehicle width direction, of the vehicle body from said front end portion, said second floor upper frame extends obliquely rearward-and-outward, in the vehicle width direction, of the vehicle body and connects the front end portion of the first floor upper frame and the hinge pillar, and said connecting member extends in the vehicle width direction and connects the inclination portion of the first floor upper frame and the front end portion of the side sill in the vehicle width direction.

* * * * *